Figure 1:
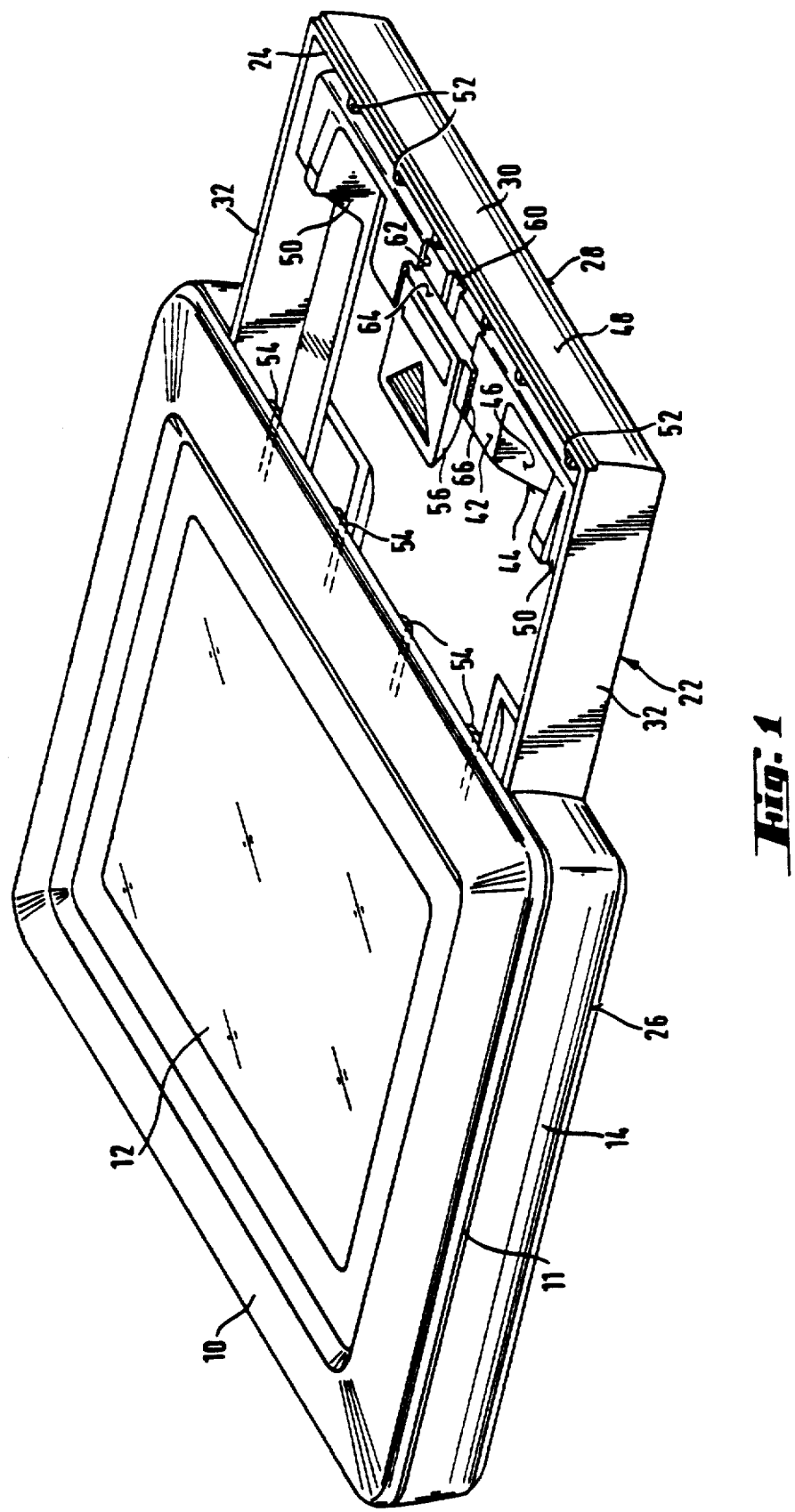

United States Patent [19]
Ackeret

[11] Patent Number: 5,113,613
[45] Date of Patent: May 19, 1992

[54] STORAGE CONTAINER FOR A PILE OF SHEETS

[75] Inventor: Peter Ackeret, Kusnacht, Switzerland

[73] Assignee: Licinvest AG, Chur, Switzerland

[21] Appl. No.: 392,979

[22] PCT Filed: Nov. 15, 1987

[86] PCT No.: PCT/EP88/01040
§ 371 Date: Jul. 6, 1989
§ 102(e) Date: Jul. 6, 1989

[87] PCT Pub. No.: WO89/04990
PCT Pub. Date: Jun. 1, 1989

[30] Foreign Application Priority Data

Nov. 21, 1987 [DE] Fed. Rep. of Germany ....... 3739498

[51] Int. Cl.⁵ .............................................. G09F 11/30
[52] U.S. Cl. .............................................. 40/513
[58] Field of Search ............... 40/490, 511, 513, 156, 40/152, 152.1, 312, 654, 649, 642; 312/204, 320; 206/455, 45.15, 555; 220/345, 346, 94 A, 347, 348, 351

[56] References Cited

U.S. PATENT DOCUMENTS

| | | | |
|---|---|---|---|
| 1,914,041 | 6/1933 | Purnell | 312/204 |
| 3,377,727 | 4/1968 | Weggeland | 40/511 |
| 3,783,540 | 1/1974 | Barclay | 40/511 |
| 4,174,034 | 11/1979 | Hoo | 220/347 X |
| 4,458,434 | 7/1984 | Ackeret | 40/513 |
| 4,586,762 | 5/1986 | Kennedy et al. | 220/94 A X |
| 4,783,919 | 11/1988 | Ackeret | 40/511 |
| 4,898,195 | 2/1990 | Sussman | 220/345 X |

FOREIGN PATENT DOCUMENTS 2912643 3/1980 Fed. Rep. of Germany .
8603026 5/1986 PCT Int'l Appl. .

Primary Examiner—Joseph Falk
Assistant Examiner—J. Bonifanti
Attorney, Agent, or Firm—Jeffrey H. Ingerman

[57] ABSTRACT

A container, especially for photographic prints, comprises a double-shell housing and a drawer which can be pulled out of the latter parallel to a window in the housing. The plane of separation of the housing is approximately flush with the upper edge of the drawer and the contour of the housing tapers, starting from the said plane of separation. For the actuation of the drawer, a grip recess portion enters from below into the drawer.

42 Claims, 4 Drawing Sheets

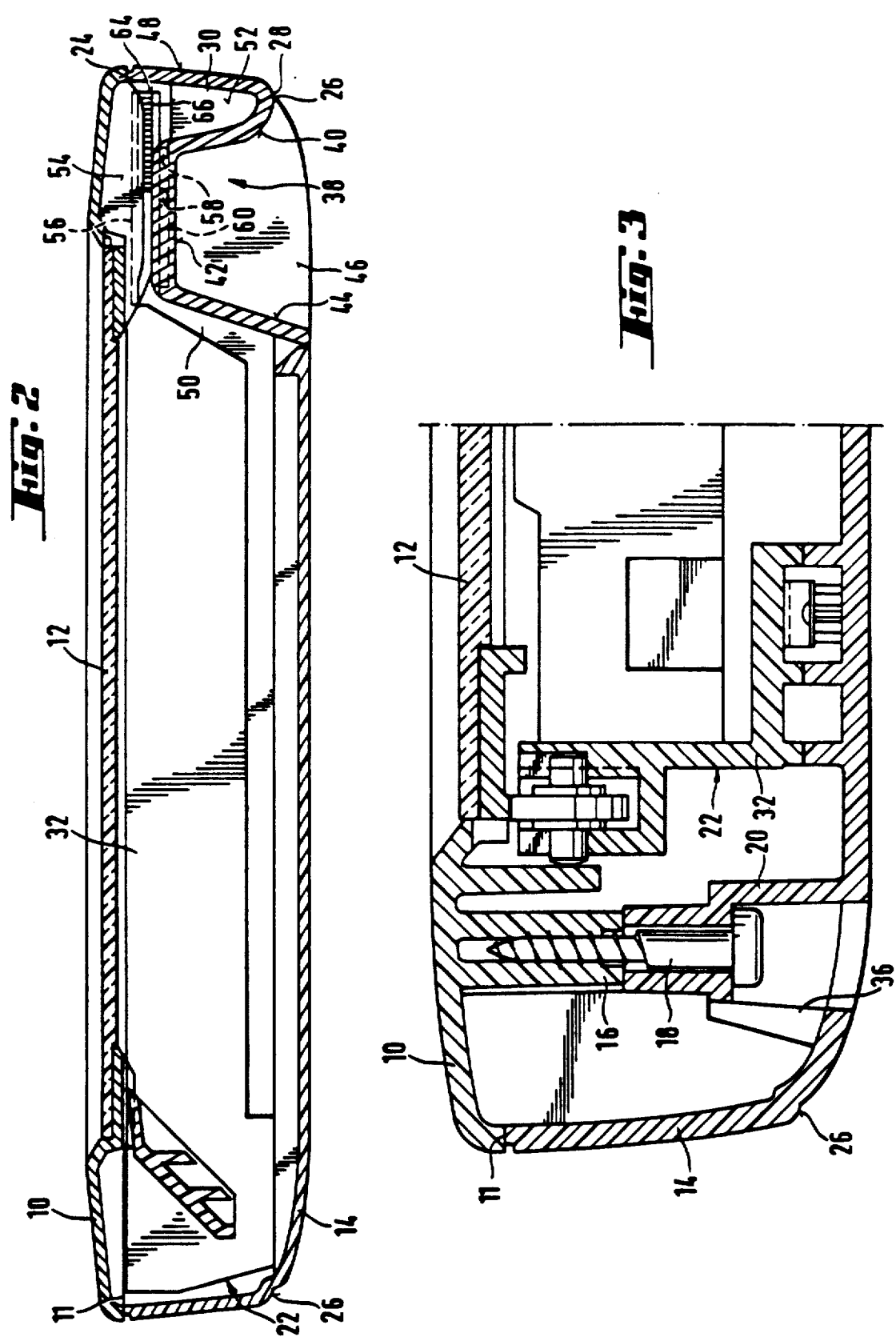

STORAGE CONTAINER FOR A PILE OF SHEETS

The invention relates to a storage container for a pile of sheets, especially one in which by means of a reciprocating movement of two frame parts relative to each other the pile of sheets which they accommodate can be cyclically rearranged; however, the invention is not limited to this application. Nevertheless, for the sake of simplicity, reference will be made hereinafter to a "sheet changer". The sheets may for example be photographic prints of the same format.

A sheet changer or storage container having a housing which has an upper shell provided with a viewing window for display of the uppermost sheet and has a lower shell, and having a slider member which can be pulled out of the housing parallel to the plane of the viewing window through an opening in the housing and pushed back in again and which has a front wall that when the slider member is pushed in closes the opening in the housing, is known from published applications Europe 0203155 and PCT International Applications Nos. WO 86/03018, WO 86/03019, WO 86/03022, WO 86/03026, WO 86/03028, WO 86/03029 and WO 86/03030.

The known sheet changer consists of a two-shell housing and a slider member or drawer, which can be pulled out of the housing parallel to the plane of a window inserted into the upper, or top, shell of the housing and pushed back in again. Each complete to and fro movement of the drawer effects the transfer of a sheet from one side of the pile to the other, so that after each such cycle another sheet is displayed beneath the window.

The plane of separation between the upper, or top, and lower, or bottom, shells of the housing lies approximately in the middle between the front and back of the container. The top and bottom shells each have a cutout into which there fits a grippable portion of the slider member.

This configuration has drawbacks from the aesthetic point of view and that of manufacture.

The grippable portion of the drawer which fits into the "picture mount" of the top shell surrounding the viewing window is reduced with respect thereto by an unavoidable line of separation which spoils the appearance of this visible side of the container, and this is particularly disturbing when the container is used as a hanging or standing frame. In order to cover this at least to some extent, the top shell and the part of the drawer flush with it should be provided with the same decorative finish. If the manufacturer wishes to offer several different decorative finishes, several components of the corresponding form must be produced, stored and assembled. This complicates the logistics of manufacture.

Like the drawer, the top and bottom shells of the housing are also injection-moulded plastics parts, which must naturally be able to be unmoulded. For this reason the container has its maximum external dimensions in the region of the plane of separation between the two shells, and the shells can taper upwards or downwards, respectively, only after this plane of separation. For this reason the container looks relatively thick when seen from the front.

The problem on which the invention is based is that of constructing the container in such a way that it is aesthetically satisfying and at the same time the logistics for its manufacture are simplified even if there is a plurality of different decorative finishes.

The solution according to the invention consists in the fact that the visible side of the container is made to look like a customary picture frame, for which purpose the features referred to in connection with the above-mentioned published applications are provided.

Starting from the plane of separation near the window, the bottom shell of the housing can be constructed with a sharply tapering contour, and to the eye the container thus seems slim, since these rear portions, when seen from the front, at a large spatial angle can no longer be detected at all or are severely curtailed.

Furthermore, it is no longer necessary to match the decorative finish of the top shell and that of the drawer. Instead, the lower shell and slider member can be produced in the most neutral uniform colour possible, for example anthracite colour, and combined with top shells of any desired decorative finish, since from the "visible side" substantially only the top shell is perceived.

A grip recess or cavity, portion, entering from below into the drawer, is better for the user from the ergonomic point of view than the grippable portion of the drawer of the known container, which has to be grasped from above and below.

In the preferred embodiment, the bottom shell is furthermore reduced by means of a shoulder with respect to its base, which is then sharply drawn in; owing to this shape, to the eye the container seems even slimmer, although it can accommodate for example up to forty photographic prints in a pile.

The invention can be embodied in a number of preferred and suitable embodiments. One such preferred embodiment of the invention is illustrated in the accompanying drawings and is explained in detail below.

Figure 4:
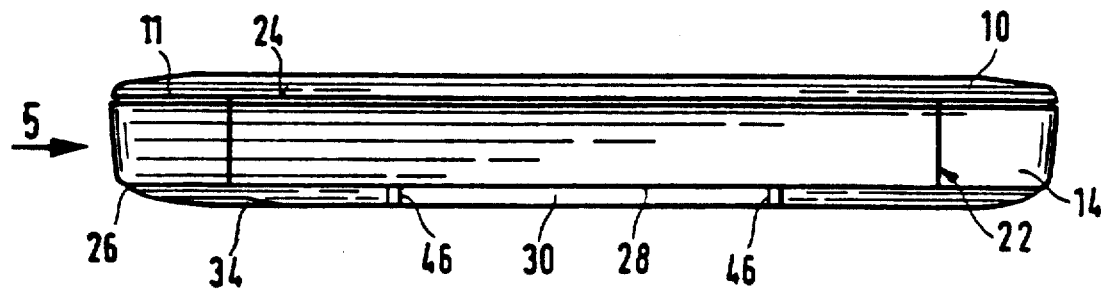
Figure 5:
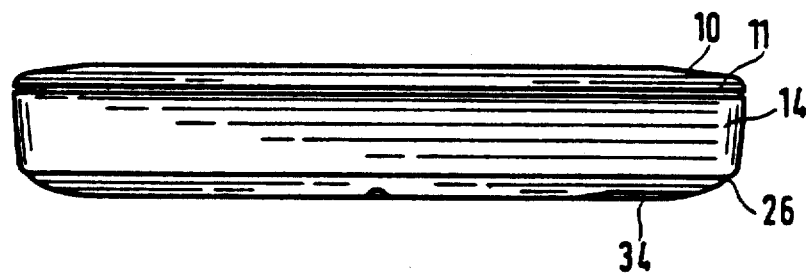
Figure 6:
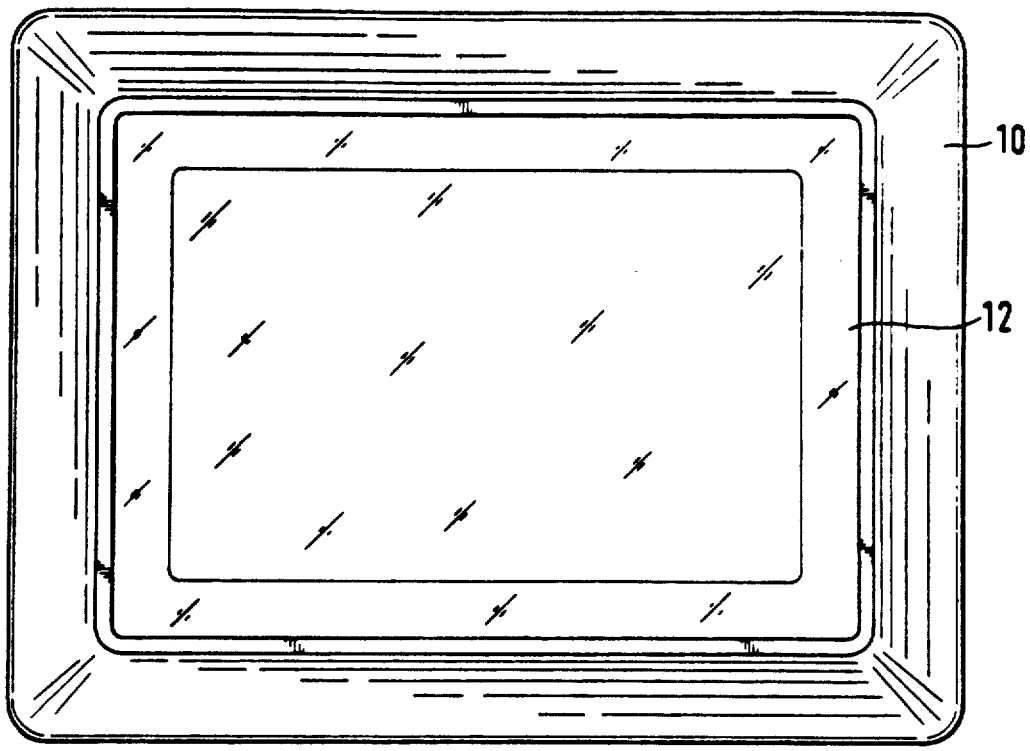
Figure 7:
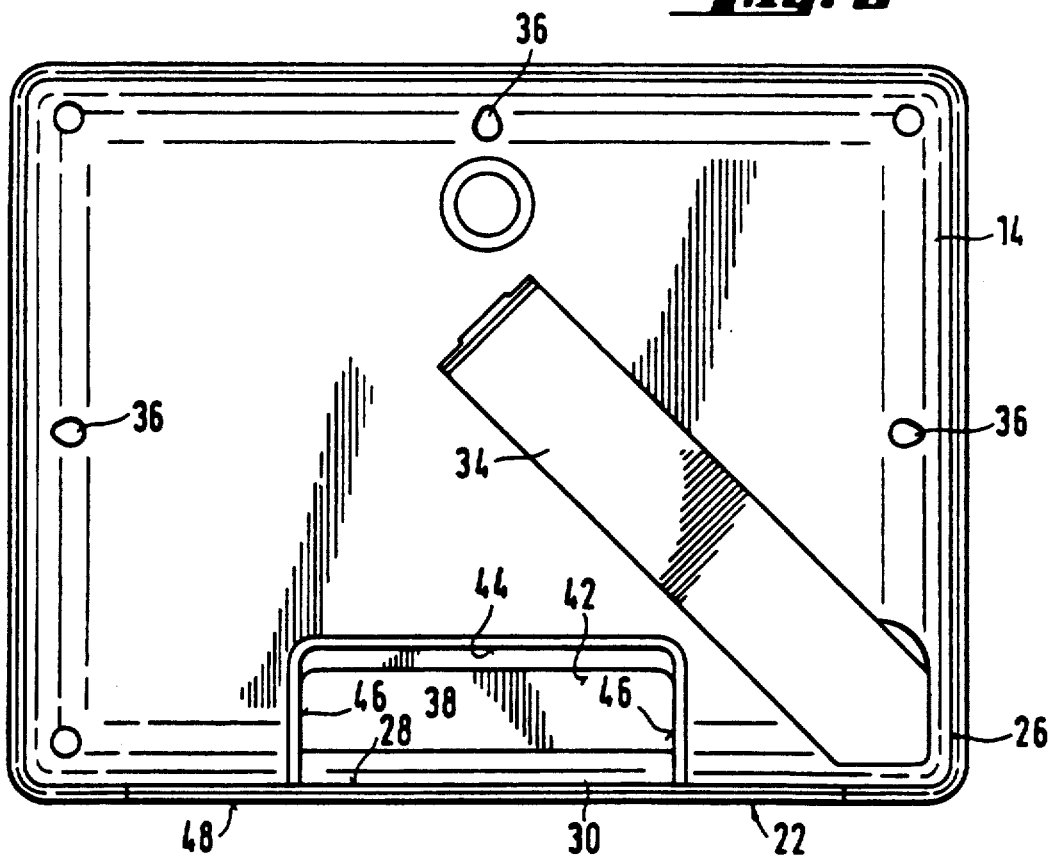

FIG. 1 shows a sheet changer according to the invention in perspective with the drawer pulled out, FIG. 2 shows a section in the central plane parallel to the direction of movement of the drawer, FIG. 3 shows a partial section perpendicular to that in FIG. 2 at the level of one of the suspension eyes, FIG. 4 is a side view of the front of the drawer when the changer is closed, FIG. 5 is a side view in the direction of the arrow "5" in FIG. 4, FIG. 6 is a plan view of the front of the changer, and FIG. 7 is a plan view of the rear side.

As can best be seen in FIGS. 2 and 3, the housing consists of a top shell 10, a transparent window pane 12 inserted into the latter, and a bottom shell 14. The pane 12 is snapped into the top shell and the bottom shell is screwed to the top shell at several points near the outer edge of both (FIG. 7). For this purpose the inside of the top shell has moulded onto it projections 16 into which connecting screws 18 are inserted; the latter are recessed into corresponding inner projections 20 of the bottom shell. It is to be understood that top and bottom shells may also be connected to each other in a different manner, for example by being snapped together, adhesively secured, etc. In a direction parallel to the plane of the pane 12, a drawer 22 can be pulled out of an access opening in the housing as far as a stop and pushed in again, and at each such to and fro movement a sheet of a pile lying in the drawer is drawn from one side of the pile and placed on the other side of the pile. Regarding the details of this rearrangement function, reference can be made to the above-mentioned published applications.

The plane of separation 11 between top shell 10 and bottom shell 14 is on a level with the straight, continuous, first front wall edge 24 of the drawer 22. Starting from this plane, the bottom shell tapers as far as a shoulder 26, and the bottom edge 28 of the drawer grip recess portion 30 also lies approximately on the same level. The undersides of the sidepieces or lateral ledges 32 of the drawer are also located approximately at this level. The contour of the front of the drawer is flush with that of the bottom shell. Beyond the shoulder 26 the bottom shell is sharply drawn in. As a result, the sheet changer in plan view (FIG. 6) looks like a customary picture frame, and it is also capable of fulfilling this function, since it can be made to stand up by means of the fold-out support foot 34. (FIG. 7; not shown in FIG. 2) and can be hung up by means of the eyes 36 formed in the bottom shell. Although the sheet changer can for example accommodate and change up to forty photographic prints, and has to be of a corresponding thickness, to the eye it seems slim since the parts of the bottom shell beyond the shoulder 26 at a spatial angle of approximately 120° are hidden when looking at the viewing window. The grip recess portion 38 of the drawer is similarly hidden.

A grip recess portion of this type is actually preferred since the drawer 22 is not accessible from above and therefore cannot be grasped between two fingers, so that it is necessary to engage the grip recess portion from below with one or more fingers to actuate the drawer. The contour of this recess portion can be seen especially clearly in FIG. 2: from the bottom front edge 28 a rounded portion 40 extends upwards (that is to say, in the direction of the page 12), and this portion then merges into a roof-like part or portion 42 which is approximately parallel to the pane and from which an inner oblique wall portion 44 extends towards the base of the housing. From FIG. 1 in conjunction with FIG. 2 it can be seen that the grip recess portion 38 is closed on all sides, since side wall portions 46 are also moulded on, perpendicular to the roof-like portions 42 and parallel to the direction of movement of the drawer. The front 48 of the drawer is smooth right across the whole width of the drawer and as far as the surface is concerned (shape, structure, colour) is identical to the adjoining portions of the bottom shell 14 of the housing, so that the boundary lines of the drawer are scarcely noticeable in side view (FIG. 4).

On both sides of the side wall portion 46 the rounded portion 40 continues as far as lateral stop members 50 for the pile which are in turn hollow on the underside. The gap between the front 48 of the drawer and the portion 40 is stiffened by means of moulded-on insert elements 52. A person skilled in the art will recognise that a drawer constructed in this way can be injection-moulded from plastics material without complicated tools and can be unmoulded easily.

Although not obligatory, it is however preferable for the grip portion to be arranged symmetrically in relation to the width of the slider member and to have a U-shaped cross section or, as in the embodiment shown by way of example, a slightly asymmetrical V-shaped cross section.

Moulded onto the inside of the top shell 10 of the housing and extending parallel to the direction of movement of the drawer are ribs 54 which hold the inserted pile at a distance from the pane 12. The upper face of the roof-like portion 42 is so low that it fits beneath these ribs. On the roof-like portion there is however also a holding-down means 56 for the pile, which means projects between two ribs 54 with the drawer pushed in, and during the insertion movement, by meeting a stop member, is pushed back against the bias of a spring, which when the drawer is pulled displaces the means over the edges of the pile of sheets carried along with the drawer, so that the pile cannot fall out. The holding-down means is in the shape of a flat box, open underneath, and is guided by two downward-projecting pins or studs 58 in a groove 60 provided in the upper face of the roof-like portion 42. Beside the groove there are dovetail guides 62 which prevent the holding-down means from falling out. The bias spring is a coiled spring with projecting ends which fits with its coil on one of the pins or studs 58 and bears with its arms symmetrically against a stop strip, moulded onto the roof-like portion 42, behind the outer edge 64 of the holding-down means. Ribbed strips 66 on the sides of the holding-down means allow it to be pushed back manually against the force of the spring so that a pile can be inserted or removed.

Between the side walls 46 of the grip recess portion and the stop members 50 for the pile there is on each side of the grip recess portion a free space into which, with the drawer pushed in, spring arms movable at right-angles to the pane 12 extend and which with the drawer withdrawn make it possible to reach into the drawer and take hold of the pile.

What is claimed is:

1. A storage container for a pile of sheets, said container comprising:

a housing having a top wall, a bottom wall and side walls and a viewing window in said top wall, and having an opening in one of said side walls;

a drawer for holding said pile of sheets, said drawer being reciprocable through said opening relative to said housing in a reciprocation direction parallel to said window between an inner end position and an outer end position, said drawer having a front wall coincident with said opening when said drawer is in said inner end position, said front wall having a substantially straight first edge facing said top wall of said housing; wherein:

said housing comprises a top shell and a bottom shell, said top shell including said top wall and said window and said bottom shell including said bottom wall; and said shells are assembled along a first plane which lies flush with said first edge of said front wall of said drawer.

2. The container of claim 1 wherein said first edge of said front wall of said drawer is hidden by said top wall of said housing when said drawer is in said inner end position and said container is viewed facing said top wall.

3. The container of claim 1 wherein said bottom shell has a contour which tapers from said first plane towards said bottom wall.

4. The container of claim 1 wherein said bottom shell includes a shoulder separating said bottom wall from said side walls.

5. The container of claim 4 wherein said bottom shell includes a rounded circumferential portion between said shoulder and said bottom wall.

6. The container of claim 4 wherein said shoulder defines a second plane parallel to said first plane, and wherein said front wall of said drawer has a bottom edge parallel to said first edge and coincident with said second plane.

7. The container of claim 4 wherein said drawer has longitudinal ledges adapted to support said pile of sheets and extending in said reciprocation direction, said ledges having bottom surfaces at least approximately level with said second plane.

8. The container of claim 1 wherein said top shell has a contour which tapers from said first plane towards said top wall.

9. The container of claim 8 wherein said contour of said top shell tapers progressively.

10. The container of claim 1 wherein said drawer and said bottom shell are injection molded from plastics material of identical color.

11. The container of claim 1 wherein said front wall of said drawer has an outer contour that is substantially identical to the contour of adjacent portions of said bottom shell.

12. The container of claim 1 wherein said drawer has a grip recess extending thereinto from an access opening opposite said top shell.

13. The container of claim 12 wherein said grip recess is contiguous with said front wall.

14. The container of claim 12 wherein said recess is centrally disposed with respect to said front wall.

15. The container of claim 1 wherein said top and bottom shells are unreleasably assembled to form said housing.

16. A storage container for a pile of sheets, said container comprising:
    a housing defining a housing interior between a top wall having a viewing window and a bottom wall defined by a base portion spaced a predetermined distance from said top wall, said housing having an opening; and
    a drawer holding said pile of sheets and being reciprocable relative to said housing through said opening in a reciprocation direction parallel to said window between an inner end position and an outer end position, said drawer having grip means for withdrawing the drawer from said inner end position toward said outer end position, said grip means comprising:
    a front wall of said drawer, said front wall of said drawer being hidden by said top wall of said housing when said drawer is in said inner end position and said container is viewed facing said top wall, and
    a cavity behind said front wall extending over a substantial portion of said predetermined distance and defined by drawer wall portions delimiting said cavity from said housing interior, said cavity being accessible via a recess in said base portion contiguous with said housing opening.

17. The container of claim 16 wherein said front wall of said drawer covers said housing opening when said drawer is in said inner end position.

18. The container of claim 17 wherein said front wall of said drawer has an outer contour that is substantially identical to the contour of adjacent portions of said housing when said drawer is in said inner end position.

19. The container of claim 18 wherein said housing has a top portion and a bottom portion joined along a housing plane, and wherein said front wall of said drawer has a straight top edge level with said housing plane.

20. The container of claim 17 wherein said drawer has sheet edge stops which space said sheets from said drawer front wall.

21. The container of claim 20 wherein said drawer has lateral ledges and said sheet edge stops are disposed adjacent said lateral ledges of said drawer.

22. The container of claim 20 wherein said cavity is disposed between said front wall of said drawer and said sheet edge stops.

23. The container of claim 20 wherein said housing has an exterior contour and surface portions, said display window being spaced from said exterior contour of said housing by said surface portions of said housing, said surface portions overlapping a space between said sheet edge stops and said front wall of said drawer when said drawer is in said inner end position.

24. The container of claim 23 wherein said surface portions have a border, said sheet edge stops being substantially congruent with said border of said surface portions when said drawer is in said inner end position.

25. The container of claim 16 wherein said cavity is centrally disposed with respect to said front wall of said drawer.

26. The container of claim 16 wherein said cavity is contiguous with said front wall of said drawer.

27. The container of claim 26 wherein said front wall has a rounded bottom edge which is contiguous with a first one of said cavity defining drawer wall portions.

28. The container of claim 27 wherein said front wall of said drawer and said first wall portion define a substantially V-shaped cross section.

29. The container of claim 28 wherein said substantially V-shaped cross section is asymmetrical.

30. The container of claim 28 wherein said substantially V-shaped cross section opens toward the exterior.

31. The container of claim 30 wherein said substantially V-shaped cross section defines a slot extending along the entire front wall of said drawer.

32. The container of claim 31 comprising stiffening insert elements molded with said front wall of said drawer and said first wall portion.

33. The container of claim 27 comprising a second wall portion opposite said first wall portion.

34. The container of claim 33 comprising a third wall portion and a fourth wall portion extending from said second wall portion toward said front wall of said drawer.

35. The container of claim 34 wherein said drawer has lateral ledges and a free space is provided between each of said third and fourth wall portions and an adjacent lateral ledge of said drawer.

36. The container of claim 35 wherein said drawer has a height and said free space extends throughout said drawer height between said top and bottom walls of said housing.

37. The container of claim 33 wherein said second wall portion is inclined with respect to said viewing window.

38. The container of claim 16 wherein said wall portions include a substantially flat roof-like portion extending substantially parallel to said viewing window.

39. The container of claim 38 wherein:
    said housing has an inner housing face, said inner housing face having ribs integrally molded therein;
    said roof-like portion is spaced from said inner housing face; and
    said roof-like portion faces said ribs when said drawer is in said inner end position.

40. The container of claim 38 wherein said drawer comprises pile holding-down means slidably disposed on said roof-like portion.

41. The container of claim 40 wherein said roof-like portion has a guide groove for slidingly receiving studs which are integrally molded with said holding-down means.

42. The container of claim 1 or claim 16 including means for cyclically rearranging a pile of sheets.

* * * * *